United States Patent [19]
Ernst et al.

[11] 4,055,371
[45] Oct. 25, 1977

[54] BALL BEARING HAVING STAGGERED BALLS

[75] Inventors: Horst Manfred Ernst, Eltingshausen; Armin Olschewski, Schweinfurt; Rainer Schurger, Schwanfeld; Lothar Walter, Schweinfurt; Manfred Brandenstein, Aschfeld; Erich Burkl, Stammheim, all of Germany

[73] Assignee: SKF Industrial Trading and Development Company, B.V., Nieuwegein, Netherlands

[21] Appl. No.: 693,509

[22] Filed: June 7, 1976

[30] Foreign Application Priority Data
June 26, 1975 Germany .................. 7520254[U]

[51] Int. Cl.$^2$ .......................................... F16C 33/40
[52] U.S. Cl. ................................. 308/201; 308/217
[58] Field of Search ............. 308/217, 201, 235, 188

[56] References Cited
U.S. PATENT DOCUMENTS

| 1,000,044 | 8/1941 | Sonnberg | 308/201 |
| 1,078,474 | 11/1913 | Vorraber | 308/201 |
| 1,214,825 | 2/1917 | Richardson | 308/201 |

Primary Examiner—Joseph F. Peters, Jr.
Assistant Examiner—Gene A. Church
Attorney, Agent, or Firm—Daniel M. Rosen

[57] ABSTRACT

A ball bearing has an inner ring and an outer ring defining inner and outer races respectively. A row of balls is provided between the races, and a cage holds the balls spaced apart from one another. The compartments of the cage are staggered alternately, so that adjacent balls engage opposite regions of the races to inhibit axial play.

8 Claims, 3 Drawing Figures

U.S. Patent    Oct 25, 1977    4,055,371
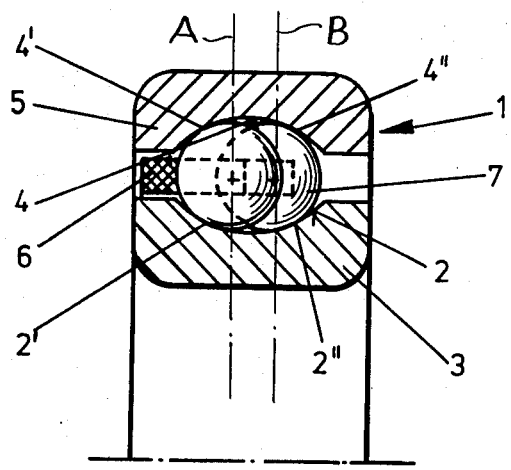
Fig.1
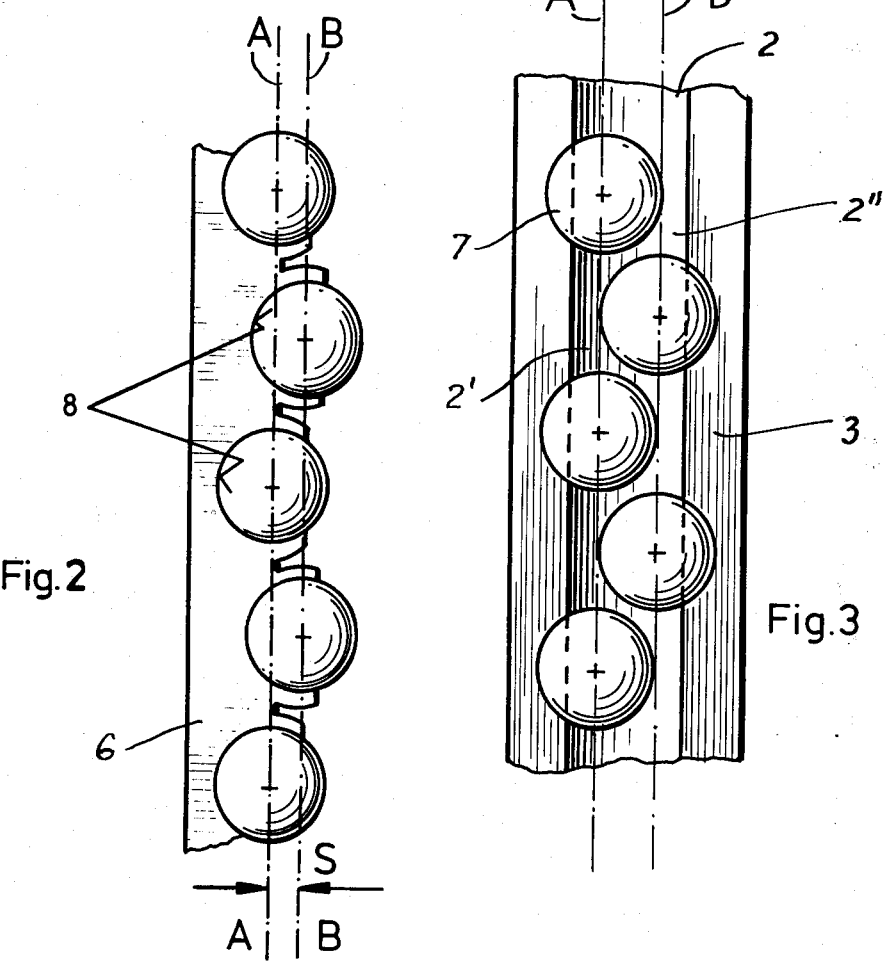
Fig.2
Fig.3

BALL BEARING HAVING STAGGERED BALLS

This invention relates to ball bearings and is particularly directed to an arrangement wherein play of the balls is minimized or inhibited.

In conventional single row radial ball bearings, an inner ring is provided on a radially outer surface with a groove forming an inner race of the bearing, and an outer ring is provided on an inner radial surface with an annular groove defining an outer race. A single row of ball bearings are positioned to roll in the grooves of both of the bearing rings, and the balls are held spaced apart from one another by a cage. In general practice, the radius of curvature of the grooves in the rings is insignificantly greater than that of the balls. As a result, in principle, such bearings have some play in the radial direction as in the axial direction.

In view of the clearance between the balls and the races, such bearings are subject to noise and vibration in use. In order to prevent the noise and vibration during operation of the bearing, two bearing structures of the above type may be employed on a common shaft, with the bearings being spaced apart in the axial direction and the play of the bearings being inhibited by the use of springs between the bearings. This solution has the disadvantage, however, that, since the axial dimension of the bearing structure has been increased, a longer shaft is required.

As a further solution, a single row grooved ball bearing may be mounted in a rubber element, for damping oscillations of the shaft. This solution does not entirely solve the problem, however, since the balls, especially the balls in the unloaded zone of the bearing where they are not in contact with the races, can start to vibrate.

The present invention is therefore directed to the provision of a ball bearing, wherein play in the bearing can be inhibited without the necessity for employing pairs of the ball bearings, and without the necessity for employing additional elements such as rubber damping elements.

Briefly stated, in accordance with the invention, this objective is achieved by providing a ball bearing wherein the compartments in the cage are staggered, so that adjacent balls engage opposite sides of the races.

In a particularly advantageous embodiment in accordance with the invention, a single row radial ball bearing is provided having inner and outer races, with a single row of balls running in the races. The compartments of the cage are spaced from one another in the axial direction of the bearing, so that the centers of the balls define two radially extending axially spaced apart planes. The centers of an equal number of balls is located in each of the planes, with adjacent balls of the row preferably being in different planes. As a consequence, the group of balls having their centers in one of the planes is pressed against one side surface of the race of each ring, and the balls having their centers in the other plane are pressed against the opposite side surface of the race of each of the rings. Axial play of the radial ball bearing is thereby eliminated solely by the formation of the cage, so that the bearing can operate without noise, and without vibration.

In order that the invention will be more clearly understood, it will now be disclosed in greater detail with reference to the accompanying drawings, wherein:

FIG. 1 is a cross-sectional view of a side of a radial ball bearing on one side of the axis thereof, in accordance with the invention, the other side thereof being substantially the same as the illustrated side;

FIG. 2 is a top view of one embodiment of a cage that may be employed in the bearing of FIG. 1, the cage being opened out in order to clarify the form thereof; and FIG. 3 is a top view of the inner ring of the ball bearing of FIG. 1, and illustrating the balls in the race, the ring being opened out to clarify the disclosure of the invention.

Referring now to the drawings, and more in particular to FIG. 1, in accordance with one embodiment of the invention, a radial ball bearing is comprised of an inner ring 3 having a running annular groove 2 in its radially outer surface, the groove 2 forming an inner race. An outer ring 5, radially outwardly of the ring 3, has a running groove 4 on its inner radial surface, the groove 4 forming the outer race of the bearing. A plurality of balls 7 are provided in the grooves 2 and 4, and are adapted to roll in these grooves.

A cage 6 has a plurality of compartments 8 for holding the balls spaced apart from one another, as illustrated more clearly in FIG. 2. While FIG. 2 shows the cage as being in the form of a snap cage, it is apparent that the cage may be of any other conventional form, such as a window cage wherein all sides of the compartments are closed. The cage may be formed of any conventional material, such as metal or a plastic. When a metal cage is employed, it is desirable to provide the contact surfaces, such as the outer surfaces of the balls, with a friction-reducing material.

In accordance with the invention, the balls of the bearing are staggered. For this purpose, as illustrated in FIGS. 1 and 2, the compartments 8 of the cage alternate in the axial direction by a distance S. As a consequence, the balls are held in either of two radially extending axially spaced apart planes A and B, with the centers of equal numbers of balls being held in each of these planes. The compartments 8 are formed so that the distance S between the planes A and B is less than the diameter of the balls, whereby the balls form a single staggered row. Preferably, adjacent balls have their centers in different planes, as illustrated in FIG. 2.

As is more clearly apparent in FIGS. 1 and 3, the balls having their centers in the plane A engage the side surfaces 2', 4' of the races 2 and 4, respectively, and the balls having their centers in the plane B engage the other side surfaces 2", 4" of the races 2 and 4, respectively. As a consequence, the axial play of the bearing illustrated in FIG. 1 is eliminated, so that the production of noise and the danger of vibration of the balls are suppressed. The elimination of noise and vibration is thereby effected without the necessity for employing a second bearing on the shaft, and without the necessity of employing any additional damping element.

While the races of the bearing rings as illustrated in FIG. 1 are shown as having grooved cross-sections, it is apparent that the races may have other cross-sections, and may, for example, be formed as slots having conical or tapered side surfaces.

While the invention has been disclosed and described with reference to a single embodiment, it is apparent that variations and modifications may be made therein, and it is therefore intended in the following claims to cover each such variation and modification as falls within the true spirit and scope of the invention.

What is claimed is:

1. In a radial ball bearing having inner and outer bearing rings with an inner race and an outer race respectively, a plurality of balls in said inner and outer races and adapted to roll therein, and a cage for holding said balls spaced apart from one another; the improvement comprising means for holding said balls spaced from one another alternately in the axial direction of said bearing, whereby a first group of said balls engages one side of said inner and outer races and a second group of said balls engages the opposite side surfaces of the same said inner and outer races to inhibit axial play in said ball bearing.

2. The ball bearing of claim 1, wherein said groups of balls have equal numbers of balls.

3. The ball bearing of claim 1, wherein said means for holding said balls comprises compartments in said cage spaced alternately in the axial direction, whereby the compartments of said cage hold said balls with the centers thereof being in either of two radial axially spaced apart planes, the centers of adjacent balls being in different said planes.

4. In a single row ball bearing having first and second spaced apart bearing rings having first and second facing races respectively, a plurality of balls in said races, and a cage having separate compartments for receiving said balls and holding said balls spaced apart from one another; the improvement wherein the compartments of said cages are spaced alternately from one another in the direction transversely of the direction between said first and second races and transversely of the circumferential direction of said bearing, whereby a first group of said balls engages one side portion of said first and second races and a second group of said balls engages the other side portion of said first and second races and play of said bearing in said transverse direction is inhibited.

5. The single row ball bearing of claim 4, wherein said groups of balls have equal numbers of balls.

6. The single row ball bearing of claim 4, wherein said first and second rings comprise inner and outer rings, respectively, adjacent said balls being spaced apart axially of said bearing, whereby axial play of said bearing is inhibited.

7. The single row ball bearing of claim 6, wherein said balls are held by said compartments with their centers in either of two axially spaced apart planes, the distance between said planes being less than the diameter of said balls.

8. The single row ball bearing of claim 4, wherein said compartments of said cage are spaced from one another in said transverse direction a distance less than the diameter of said balls.

* * * * *